(12) United States Patent
Park et al.

(10) Patent No.: US 12,379,480 B2
(45) Date of Patent: Aug. 5, 2025

(54) RADAR DEVICE FOR VEHICLE AND CONTROL METHOD THEREOF

(71) Applicant: HL Klemove Corp., Incheon (KR)

(72) Inventors: Jong Gyu Park, Yongin-si (KR); Hanyeol Yu, Suwon-si (KR); Hyeon Dong Cho, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 382 days.

(21) Appl. No.: 17/865,525

(22) Filed: Jul. 15, 2022

(65) Prior Publication Data

US 2023/0280456 A1 Sep. 7, 2023

(30) Foreign Application Priority Data

Mar. 2, 2022 (KR) .......... 10-2022-0026555

(51) Int. Cl.
  *G01S 13/44* (2006.01)
(52) U.S. Cl.
  CPC ...... *G01S 13/4427* (2013.01); *G01S 13/4454* (2013.01)
(58) Field of Classification Search
  CPC ........... G01S 13/4427; G01S 13/4454; G01S 7/4021; G01S 13/42; G01S 7/03; G01S 13/931
  See application file for complete search history.

(56) References Cited

U.S. PATENT DOCUMENTS

| | | | | |
|---|---|---|---|---|
| 4,656,642 A | * | 4/1987 | Apostolos | H04L 27/103 342/368 |
| 5,012,254 A | * | 4/1991 | Thompson | H01Q 21/22 342/373 |
| 5,325,101 A | * | 6/1994 | Rudish | H01Q 21/205 342/372 |
| 5,414,433 A | * | 5/1995 | Chang | H01Q 3/22 342/372 |

(Continued)

FOREIGN PATENT DOCUMENTS

KR 10-2012-0100039 A 9/2012
KR 10-2019-0117932 A 10/2019

(Continued)

OTHER PUBLICATIONS

Korean Office Action issued on Nov. 18, 2024, in connection with the corresponding Korean Patent Application No. 10-2022-0026555, with its English translation, 21 pages.

*Primary Examiner* — Peter M Bythrow
(74) *Attorney, Agent, or Firm* — Hauptman Ham, LLP

(57) ABSTRACT

The radar device for a vehicle according to an exemplary embodiment of the present invention includes an antenna part including a plurality of transmitting antennas and a plurality of receiving antennas, the antenna part being formed of array antennas; a signal processor for detecting a target by processing a radar signal and a reflected signal transmitted and received through the antenna part; and a feeding part for correcting phases of the radar signal and the reflected signal through a feeding line connecting the (Continued)

antenna part and the signal processor, wherein the signal processor corrects a phase of a noise signal based on the phase information of a feeding line designed such that a false target corresponding to the noise signal incoming is detected at a specific angle.

13 Claims, 9 Drawing Sheets

(56) References Cited

U.S. PATENT DOCUMENTS

| | | | | |
|---|---|---|---|---|
| 5,479,177 | A * | 12/1995 | Rudish | H01Q 3/2682 342/375 |
| 5,493,306 | A * | 2/1996 | Rudish | H01Q 3/2682 342/372 |
| 6,215,438 | B1 * | 4/2001 | Oswald | G01S 13/931 342/28 |
| 6,686,867 | B1 * | 2/2004 | Lissel | H01Q 25/002 343/753 |
| 2008/0297400 | A1 * | 12/2008 | Hansen | G01S 7/032 342/70 |
| 2008/0297414 | A1 * | 12/2008 | Krishnaswamy | H03L 7/087 342/368 |
| 2009/0315761 | A1 * | 12/2009 | Walter | G01S 13/931 342/200 |
| 2011/0273325 | A1 * | 11/2011 | Goldman | G01S 13/42 342/146 |
| 2014/0218240 | A1 * | 8/2014 | Kpodzo | G01S 3/043 342/450 |
| 2019/0288378 | A1 * | 9/2019 | DiFonzo | H04W 16/28 |
| 2019/0317185 | A1 * | 10/2019 | Park | G01S 7/03 |
| 2021/0104818 | A1 * | 4/2021 | Li | G01S 7/03 |
| 2021/0382165 | A1 * | 12/2021 | Choi | G01S 3/023 |

FOREIGN PATENT DOCUMENTS

| | | |
|---|---|---|
| KR | 10-2021-0013082 A | 2/2021 |
| KR | 10-2021-0109855 A | 9/2021 |

* cited by examiner

RADAR DEVICE FOR VEHICLE AND CONTROL METHOD THEREOF

CROSS-REFERENCE TO RELATED APPLICATION

This application claims priority to and the benefit of Korean Patent Application No. 10-2022-0026555 filed on Mar. 2, 2022, the disclosure of which is incorporated herein by reference in its entirety.

TECHNICAL FIELD

The present invention relates to a radar device for a vehicle and a control method thereof.

BACKGROUND ART

Although the internal configuration of a radar system is becoming more complicated, an increase in the module size of the radar system inevitably limited if mounting in a vehicle environment is considered. In order to overcome this limitation, the design with a high degree of integration of the radar system has been pursued.

As the degree of integration of the radar system increases, the possibility that noise signals generated from power sources or electronic components are introduced into radar signals has inevitably increased. If a noise signal is introduced, the noise signal may generate a specific frequency component, and the vehicle radar may misrecognize it as a target.

In particular, an autonomous vehicle in which the advanced driver assistance system (ADAS) is implemented may misrecognize a noise signal as a target and perform emergency braking.

DISCLOSURE

Technical Problem

An object of the present invention is to provide a radar device for a vehicle, which is capable of intentionally reducing the risk of misrecognizing a noise signal as a target, and a control method thereof.

Technical Solution

The radar device for a vehicle according to an exemplary embodiment of the present invention includes an antenna part including a plurality of transmitting antennas and a plurality of receiving antennas, the antenna part being formed of array antennas; a signal processor for detecting a target by processing a radar signal and a reflected signal transmitted and received through the antenna part; and a feeding part for correcting phases of the radar signal and the reflected signal through a feeding line connecting the antenna part and the signal processor, wherein the signal processor corrects a phase of a noise signal based on the phase information of a feeding line designed such that a false target corresponding to the noise signal incoming is detected at a specific angle.

The feeding line may be provided in plurality so as to respectively connect the plurality of transmitting antennas and the plurality of receiving antennas to the signal processor.

Each feeding line provided to respectively connect the plurality of receiving antennas and the signal processor may be designed to have a length corresponding to the phase information.

The signal processor may correct the phase of the noise signal such that the false target is detected at a specific angle outside the area where the antenna part detects the target based on the phase information of the feeding line.

When the antenna part is disposed in front of a vehicle, the signal processor may correct the phase of the noise signal such that the false target is detected at a specific angle outside a vehicle control area based on the phase information of the feeding line.

The signal processor may re-correct the phase of the reflected signal based on the phase information of the feeding line, and acquire information of the target based on the re-corrected reflected signal The method for controlling a radar device for a vehicle according to an exemplary embodiment of the present invention includes the steps of transmitting a radar signal through a plurality of transmitting antennas included in an antenna part and formed of array antennas; receiving a reflected signal corresponding to the radar signal through a plurality of receiving antennas included in the antenna part and formed of array antennas; correcting a phase of the reflected signal through a feeding line connecting the antenna part and a signal processor; and correcting the phase of the noise signal based on the phase information of a feeding line designed such that a false target corresponding to the noise signal incoming is detected at a specific angle.

The step of correcting the phase of the noise signal may include correcting the phase of the noise signal such that the false target is detected at a specific angle outside the area where the antenna part detects the target based on the phase information of the feeding line.

The step of correcting the phase of the noise signal may include correcting the phase of the noise signal such that the false target is detected at a specific angle outside a vehicle control area based on the phase information of the feeding line, when the antenna part is disposed in front of a vehicle.

The control method may further include the steps of re-correcting the phase of the reflected signal based on the phase information of the feeding line; and acquiring target information based on the re-corrected reflected signal.

The design device for designing a feeding line installed in a radar device for a vehicle according to an exemplary embodiment of the present invention includes a processor for identifying an area in which the radar device detects a target, identifying a phase of a noise signal entered into the radar device, identifying phase information of a feeding line such that a false target corresponding to the noise signal is detected at a specific angle outside the area based on the phase of the identified noise signal, and identifying length information of the feeding line based on the phase information.

The processor may identify the phase information based on interval information between a plurality of receiving antennas included in the radar device, and identifies the length of the feeding line corresponding to the phase information for each of the plurality of receiving antennas.

When the radar device is disposed in front of a vehicle, the processor may identify the phase information of the feeding line such that the false target is detected at a specific angle outside a vehicle control area.

Advantageous Effects

According to an exemplary embodiment of the present invention, it is possible to improve driving stability by preventing a false target corresponding to a noise signal from being detected in the detection area of the radar device.

MODES OF THE INVENTION

Figure 1:
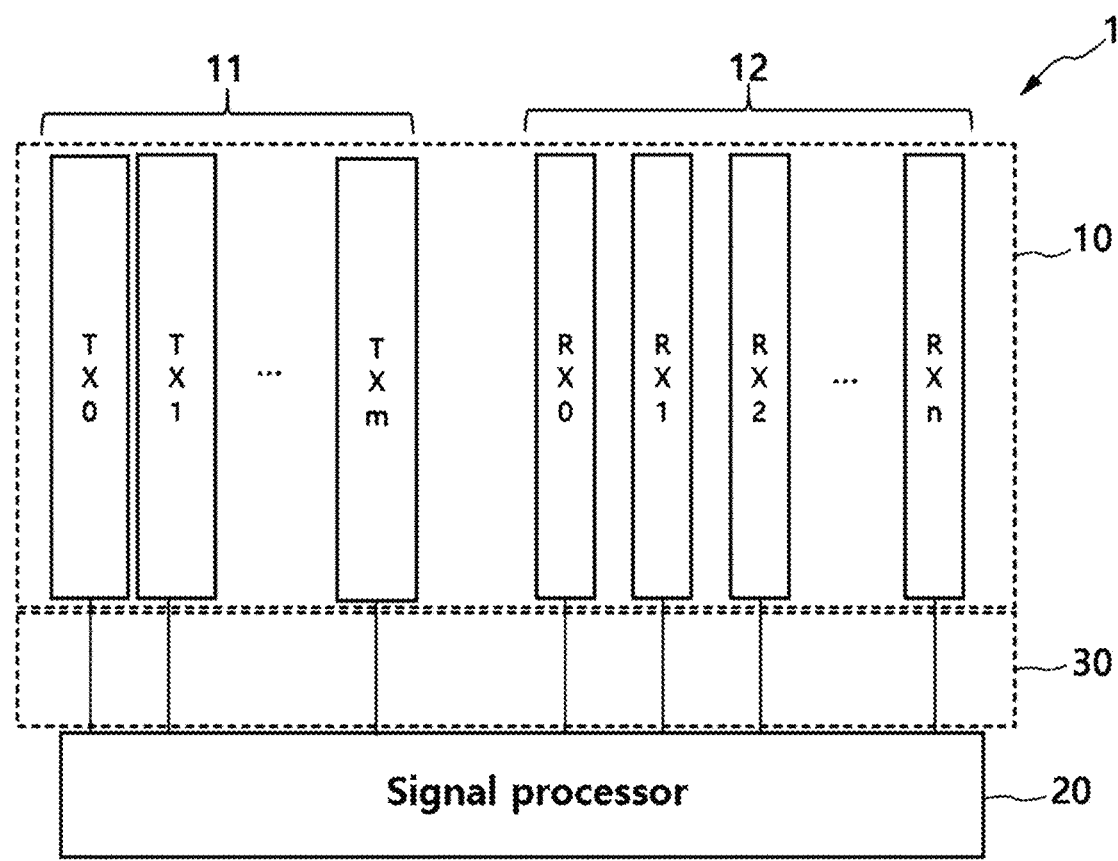
FIG. 1 is a diagram illustrating the configuration of a radar device according to an exemplary embodiment of the present invention.

Hereinafter, preferred exemplary embodiments according to the present invention will be described in detail with reference to the accompanying drawings. The detailed description set forth below in conjunction with the accompanying drawings is intended to describe the exemplary embodiments of the present invention and is not intended to represent the only exemplary embodiments in which the present invention may be practiced. In order to clearly describe the present invention in the drawings, parts irrelevant to the description may be omitted, and the same reference numerals may be used for the same or similar components throughout the specification.

FIG. 1 is a diagram illustrating the configuration of a radar device according to an exemplary embodiment of the present invention.

Referring to FIG. 1, the radar device 1 for a vehicle according to an exemplary embodiment of the present invention may include an antenna part 10, a signal processor 20 and a feeding part 30.

According to an exemplary embodiment of the present invention, the vehicle on which the radar device 1 is mounted is not limited to any one such as cars, motorcycles or the like, and the radar device 1 may be installed in the front, rear or side of the vehicle, and it is not limited to the installation position thereof.

According to an exemplary embodiment of the present invention, the antenna part 10 includes a plurality of transmitting antennas 11 and a plurality of receiving antennas 12 formed of array antennas. In this case, the antenna part 10 may be implemented by being disposed on a PCB substrate.

According to an exemplary embodiment of the present invention, the signal processor 20 identifies target information such as the location and distance of a target by processing a radar signal and a reflected signal transmitted and received through the antenna part 10.

According to an exemplary embodiment of the present invention, the signal processor 20 may transmit a radar signal in a specific operating frequency band through a plurality of transmitting antennas 11, and receive a reflected signal in which the radar signal hits and returns through a plurality of receiving antennas 12. The signal processor 20 may detect the angle at which the target is located by using a phase difference that is minutely generated between the reflected signals received from the plurality of receiving antennas 12. More details will be described in FIG. 3.

According to an exemplary embodiment of the present invention, the feeding part 30 may include a feeding line connecting the antenna part 10 and the signal processor 20, and the feeding line may be provided in plurality so as to respectively connect the plurality of transmitting antennas 11 and the plurality of receiving antennas 12 to the signal processor 20.

The signal processor 20 generates a radar signal in a specific operating frequency band, and transmits the same through the transmitting antenna 11 through the feeding part 30. In addition, the reflected signal received through the transmitting antenna 11 is transmitted to the signal processor 20 through the feeding part 30.

The feeding part 30 may place a standard target in a stable condition (chamber) in order to reduce errors that may occur for each product in the process of feeding and manufacturing and assembling parts forming the antenna, and perform phase correction of signals when transmitting radar signals and receiving reflected signals. That is, it transmits/receives by correcting phase characteristics that may vary depending on the shape and length of the feeding line in the feeding part 30. Then, the phase information may be stored such that the signal processor 20 can identify the target information by using the reflected signal that has been phase-corrected by the feeding part 30 and entered. The phase information includes a phase correction value that varies depending on the shape and length of each feeding line, the distance between the plurality of antennas and the material of a PCB substrate on which the antennas are disposed. In this case, the phase correction value may be provided for each feeding line.

According to an exemplary embodiment of the present invention, in order for the signal processor 20 to analyze an incoming signal to detect a target, it is necessary to re-correct the phase again that has been corrected by the feeding part 30. Since this can also be applied to the noise signal entered into the radar device 1, when the phase correction value included in the phase information is appropriately adjusted, it is possible to adjust the phase of the noise signal. According to the present invention, by shifting the phase of the noise signal, it is possible to minimize the risk of detecting a so-called false target, which is recognized as if there is a target even though there is no target according to the noise signal.

Hereinafter, the process of designing the length of the feeding line required to correct the phase of the noise signal in the present invention will be described in detail.

Figure 2:
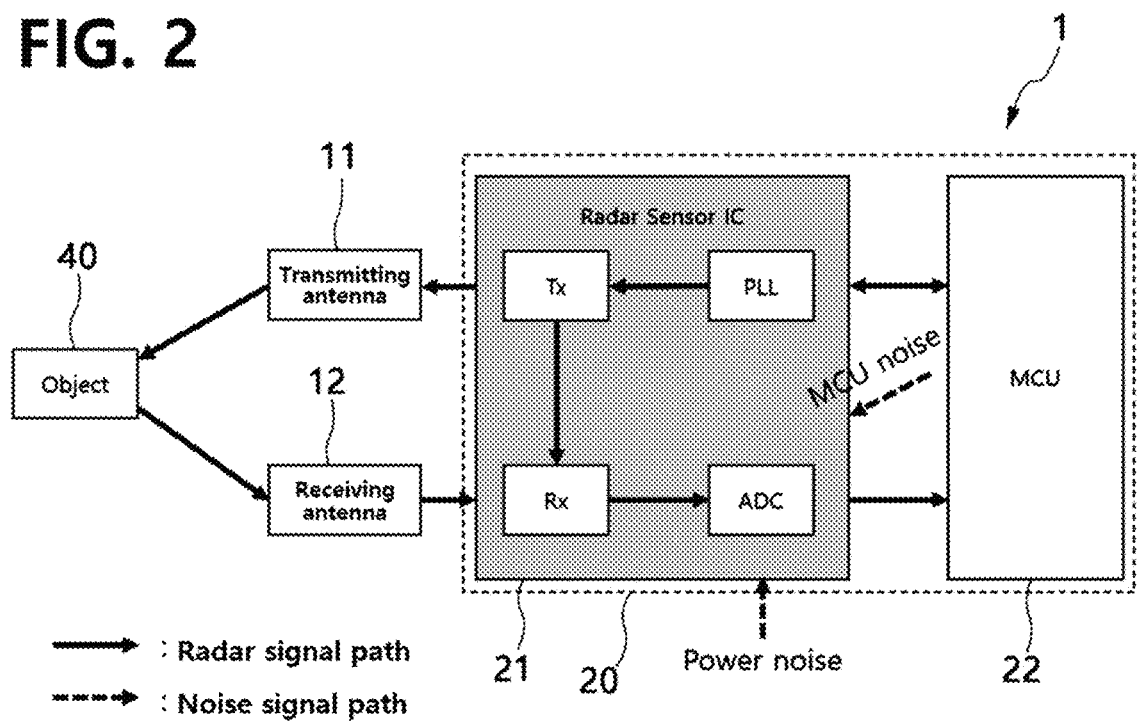
FIG. 2 is a diagram illustrating a signal path of the radar device according to an exemplary embodiment of the present invention.

FIG. 2 is a diagram illustrating a signal path of the radar device according to an exemplary embodiment of the present invention.

Referring to FIG. 2, a radar signal path and a noise signal path of the radar device 1 are illustrated. In this case, since the radar device 1 is the same as that described with reference to FIG. 1, the description of the overlapping contents will be omitted.

According to an exemplary embodiment of the present invention, the signal processor 20 may largely include a radar sensor circuit 21 and a microcontroller unit (MCU) 22, and the radar sensor circuit (radar sensor IC) 21 may include a transmitter (Tx), a receiver (Rx), a phase locked loop (PLL) and a converter (analog-digital converter, ADC).

When the MCU 22 transmits a control command to the radar sensor circuit 21, the radar sensor circuit 21 generates a radar signal corresponding to the control command through the phase lock circuit (PLL) and the transmitter (Tx) and transmits to the transmitting antenna 11. The radar signal transmitted through the transmitting antenna 11 hits the target 40 and is reflected and transmitted to the receiving antenna 12. The receiver (Tx) receives the reflected signal through the receiving antenna 12 and transmits it to the converter (ADC). The converter (ADC) converts the reflected signal back into a digital signal and transmits it to the MCU 22. The MCU 22 may identify target information such as a location, an angle and a distance of the target by using the received signal.

In addition, although not illustrated in FIG. 2, the transmitter (Tx) may further include an oscillator such as a local oscillator for generating a radar signal, and the receiver (Rx) may further include a low noise amplifier (LNA) for low-noise amplification of a reflected signal that has been received through the receiving antenna 12, a mixer for mixing the low-noise amplified reflected signal, and an amplifier for amplifying the mixed reflected signal. In this case, the converter (ADC) digitally converts the amplified reflected signal to generate received data, and transmits it to the MCU 22.

Meanwhile, according to an exemplary embodiment of the present invention, whereas the radar signal moves along the predetermined path as described above, in the case of a noise signal generated inside the radar device 1, it is directly entered into the converter (ADC) or the radar sensor circuit 21. The noise signal means noise coming from an electronic product such as a power supply unit adjacent to the radar sensor circuit 21 or the MCU 22 according to a highly integrated design of the radar device 1. That is, since the noise signal is not a signal coming through the feeding part 30, it is not affected by the phase correction performed by the feeding part 30.

Although the operations associated with the transmission/reception and processing of signals according to the present invention operate according to each of the above-described configurations, these are described as being performed by the signal processor 20 for the convenience of description.

According to an exemplary embodiment of the present invention, as the paths of the radar signal and the noise signal are different from each other, the signal processor 20 may differentiate and respond thereto.

Figure 3:
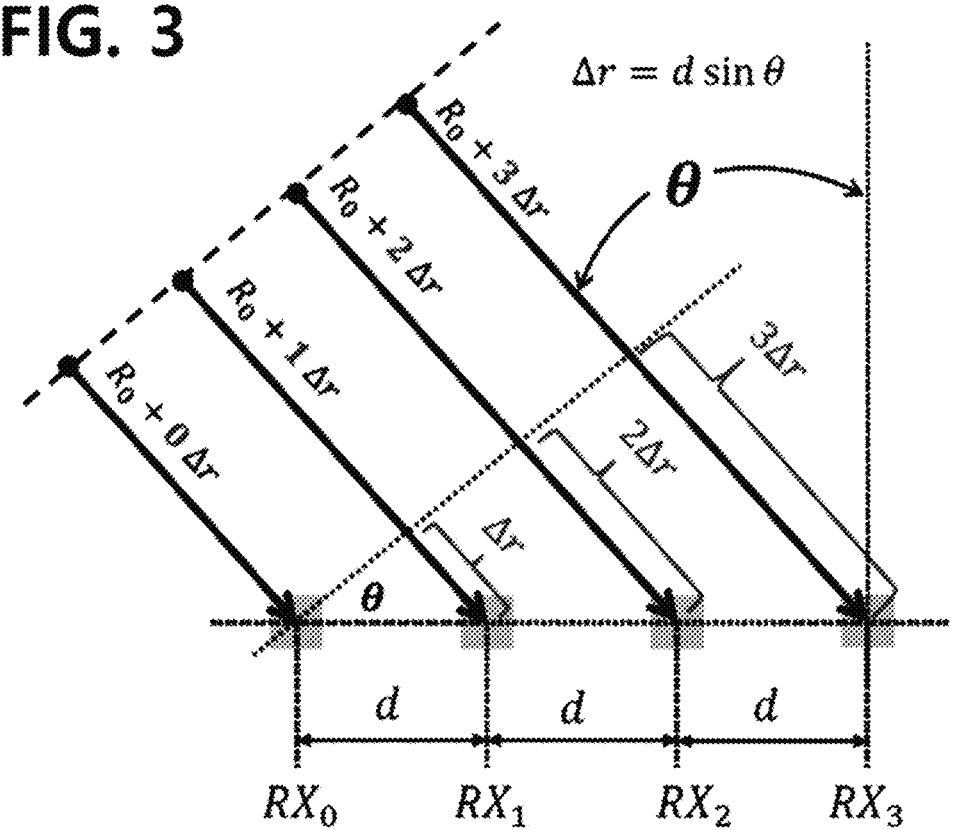
FIG. 3 is a diagram illustrating a state in which the angle of a target is detected by a phase difference.

FIG. 3 is a diagram illustrating a state in which the angle of a target is detected by a phase difference.

Referring to FIG. 3, the angle between a target and a receiving antenna may be estimated by using a phase difference between reflected signals received through a plurality of receiving antennas RX0, RX1, RX2, RX3.

In the case of a reflected signal that hits a target and returns, a time difference at which the signal is received occurs depending on the position of the antenna. If this is expressed as a distance, for example, the distance between the target and the antenna RX0 is R0, and the distance between the target and the antenna RX1 is a value obtained by adding a phase difference of d*sin θ (d: the distance between the antennas RX0 and RX1) to R0. Similarly, the distance between the target and the antenna RX2 is a value obtained by adding a phase difference of 2d*sin θ (2d: the interval between the antennas RX0 and RX2) to R0.

Accordingly, the signal processor 20 may detect an angle between the target and the radar device 1 by using the phase difference.

Figure 4:
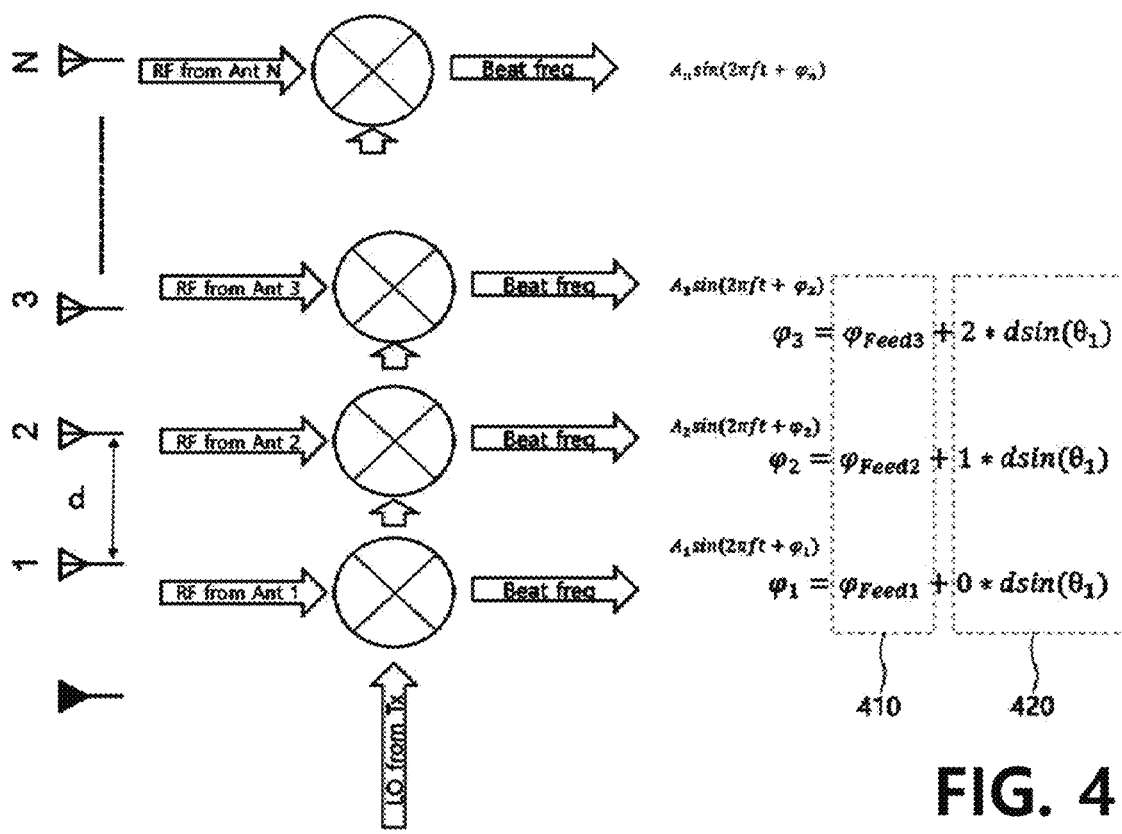
FIG. 4 is a diagram illustrating the phase of a radar reflected signal according to an exemplary embodiment of the present invention.

FIG. 4 is a diagram illustrating the phase of a radar reflected signal according to an exemplary embodiment of the present invention.

Referring to FIG. 4, there are receiving antennas (1, 2, 3, . . . , N) having an interval of d between the antennas. The reflected signals (RF from Ant 1, 2, 3, . . . , N) coming from each receiving antenna (1, 2, 3, . . . , N) become radar beat signals (beat freq) by the local oscillator (LO from TX) of the transmitter and the mixer. However, since the phases of the radar beat signal and the reflected signal received through the receiving antenna are the same, these are referred to as reflected signals for the convenience of explanation in the present specification.

According to an exemplary embodiment of the present invention, the reflected signal has a waveform of $A_n \sin(2\pi ft + \varphi_n)$. In this case, the phase ($\varphi_n$) of the reflected signal includes the phase correction value ($\varphi_{Feed_n}$) 410 according to the phase correction performed by the feeding part 30 and the phase difference ($(n-1)d*\sin(\theta_1)$) 420 of the receiving antenna.

The signal processor 20 may re-correct the phase of the reflected signal based on the phase information of the feeding line, and may acquire information of the target based on the re-corrected reflected signal.

That is, if only the phase correction value 410 is known, the signal processor may perform re-correction to remove the phase correction value 410 to identify the angle ($\theta_1$) between the target 40 and the radar device 1.

The phase information including the phase correction value may be determined through a calibration operation in the mass production process of the radar device 1. Accordingly, the signal processor 20 may store the phase information of the feeding line as described above and use the same during the recalibration operation.

Figure 5:
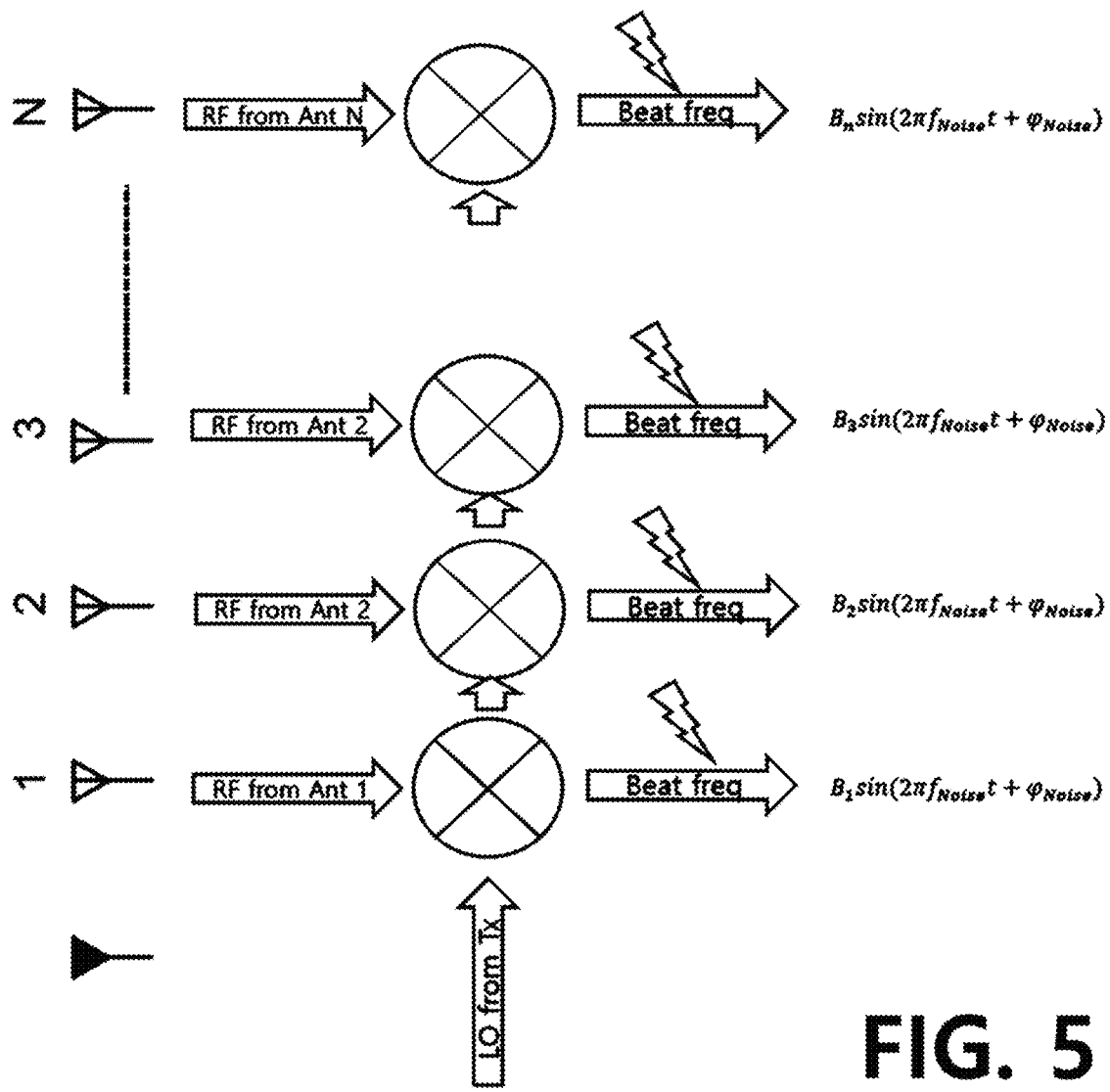
FIG. 5 is a diagram illustrating the phase of a noise signal according to an exemplary embodiment of the present invention.

FIG. 5 is a diagram illustrating the phase of a noise signal according to an exemplary embodiment of the present invention.

Referring to FIG. 5, it can be seen that a noise signal is entered in the same situation as in FIG. 4. In this case, since the noise signal is entered after the effective reflected signal is converted into a radar beat signal through a predetermined process, there is no mutual influence between the two.

According to an exemplary embodiment of the present invention, the noise signal has a waveform of $B_n \sin(2\pi f_{Noise} t + \varphi_{Noise})$, and the noise signal is a signal that is linearly entered into the signal processor 20 as described above and has a similar phase for each channel. Accordingly, when the signal processor 20 performs phase re-correction to detect the angle with the target, the noise signal becomes dependent on the phase correction value. That is, the phase of the noise signal is determined according to how the phase correction value is set, and the angle of the false target is determined according to where the determined phase is located. In this case, the angle of the false target means an angle between the radar device 1 and the false target. Therefore, it is important to set the phase correction value such that the false target corresponding to the noise signal is located at a position that does not affect target detection, such as outside of the detection area of the radar device 1.

Hereinafter, this will be described in more detail.

Figure 6:
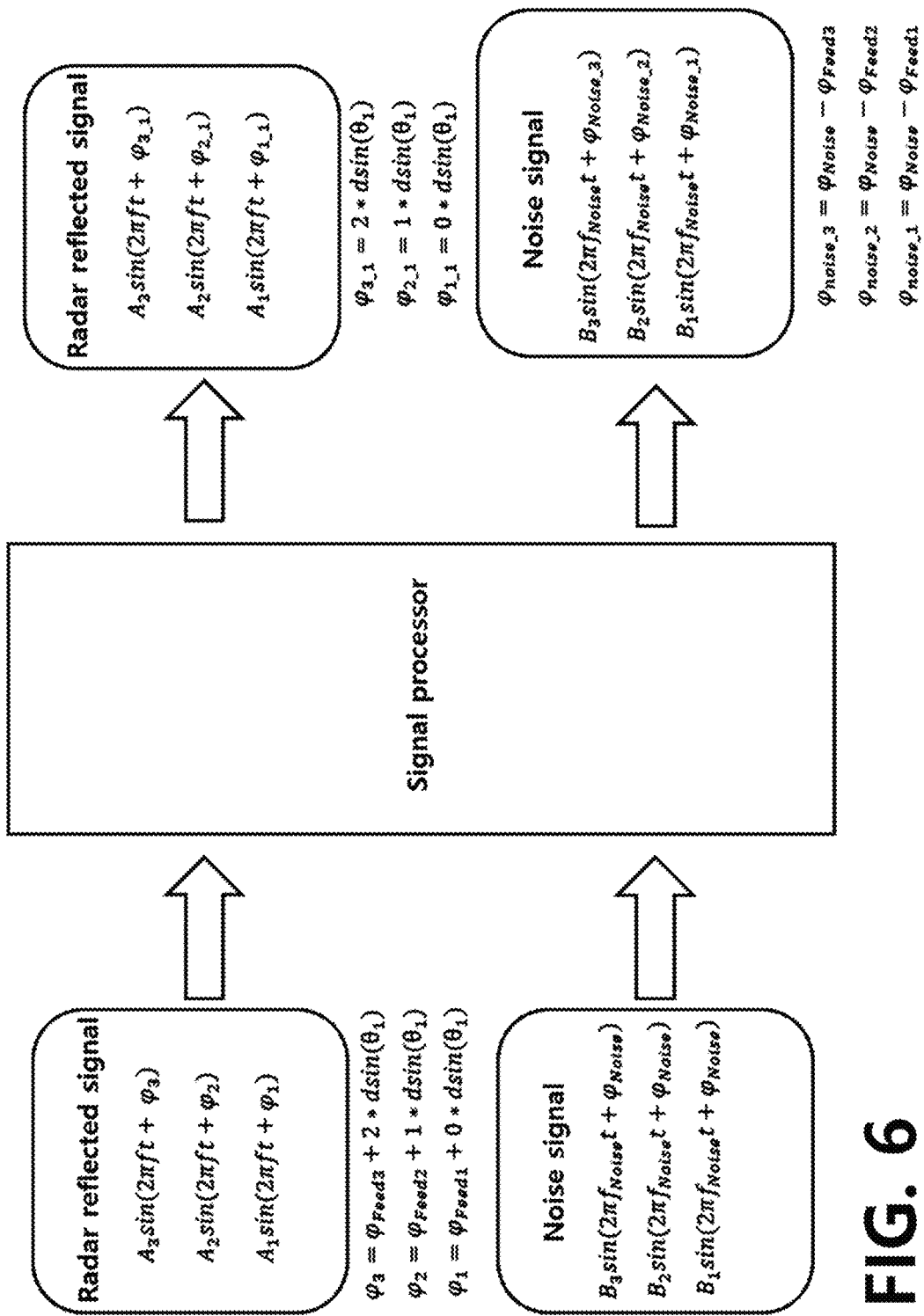
FIG. 6 is a diagram illustrating the phase correction of a radar device according to an exemplary embodiment of the present invention.

FIG. 6 is a diagram illustrating the phase correction of a radar device according to an exemplary embodiment of the present invention.

Referring to the left side of FIG. 6, the reflected signals received from the three receiving antennas have the waveforms of $A_1 \sin(2\pi ft+\varphi_1)$, $A_2 \sin(2\pi ft+\varphi_2)$ and $A_3 \sin(2\pi ft+\varphi_3)$, respectively, and the phases of each reflected signal are $\varphi_1=\varphi_{Feed1}+0*d \sin(\theta_1)$, $\varphi_2=\varphi_{Feed2}+1*d \sin(\theta_1)$ and $\varphi_3=\varphi_{Feed3}+2*d \sin(\theta_1)$ in this order. As reviewed in FIG. 4 above, the phase of each reflected signal is composed of a phase correction value 410 performed by the feeding part 30 and a phase difference 420 according to the position of the receiving antenna. In this case, since the phase correction values ($\varphi_{Feed1}$, $\varphi_{Feed2}$, $\varphi_{Feed3}$) can be identified through pre-stored phase information, the signal processor 20 may perform phase re-correction to remove the phase correction values ($\varphi_{Feed1}$, $\varphi_{Feed2}$, $\varphi_{Feed3}$) from each reflected signal.

As described on the right side of FIG. 6, the phase re-corrected reflected signals have the waveforms of $A_1 \sin(2\pi ft+\varphi_{1\_1})$ $A_2 \sin(2\pi ft+\varphi_{2\_1})$ and $A_3 \sin(2\pi ft+\varphi_{3\_1})$, and the phases of each reflected signal have $\varphi_{1\_1}=0*d \sin(\theta_1)$, $\varphi_{2\_1}=1*d \sin(\theta_1)$ and $\varphi_{3\_1}=2*d \sin(\theta_1)$ in this order. Accordingly, the signal processor 20 may identify the angle between the target and the radar device 1 by using the corrected phase difference between the received reflected signals.

In addition, since the noise signals entered from the inside of the radar device 1 have almost the same frequency or phase, the phase of the noise signal is greatly affected by the phase correction value when the signal processor 20 performs re-correction.

That is, as reviewed in FIG. 5, since the angle of the false target corresponding to the noise signal varies according to the phase correction value, it is possible to improve driving stability by designing the phase correction value.

Figure 7:
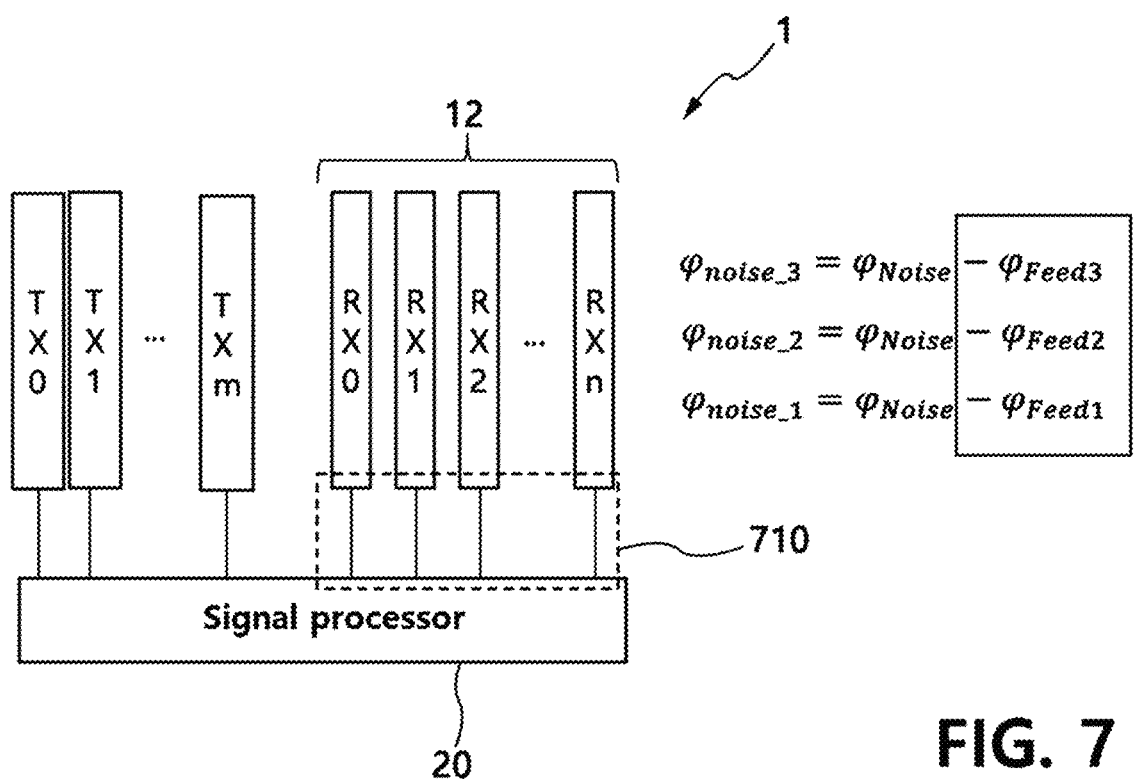
FIG. 7 is a diagram illustrating the phase correction according to the length of a feeding line according to an exemplary embodiment of the present invention.

FIG. 7 is a diagram illustrating the phase correction according to the length of a feeding line according to an exemplary embodiment of the present invention.

FIG. 7 schematically illustrates the radar device 1 according to an exemplary embodiment of the present invention. Referring to FIG. 7, among the feeding lines of the feeding part 30, the plurality of feeding lines 710 connecting the plurality of receiving antennas 12 and the signal processor 20 have the same length. That is, the phase correction values ($\varphi_{Feed1}$, $\varphi_{Feed2}$, $\varphi_{Feed3}$) that are corrected by the feeding line 710 have the same values.

Therefore, as described with reference to FIGS. 5 and 6, the phase ($\varphi_{noise}$) of the noise signal is similar for each signal, and since the phase correction values ($\varphi_{Feed1}$, $\varphi_{Feed2}$, $\varphi_{Feed3}$) in FIG. 7 have the same value, the corrected phases of the noise signals ($\varphi_{noise\_1}$, $\varphi_{noise\_2}$, $\varphi_{noise\_3}$) do not differ for each signal.

That is, since there is no phase difference between signals, in this case, the angle of the false target corresponding to the noise signal becomes 0 degrees. As such, when the lengths of the plurality of feeding lines 710 are the same, the false target according to the noise signal may be identified as being located at 0 degrees. However, target identification at 0 degrees may lead to a dangerous situation in some cases. For example, when the radar device 1 is disposed in the front, it is recognized that the target is located in the front such that a dangerous situation such as emergency braking may occur. Therefore, it is necessary to design the feeding line such that the false target according to the noise signal is located at a different specific angle, if necessary.

Figure 8:
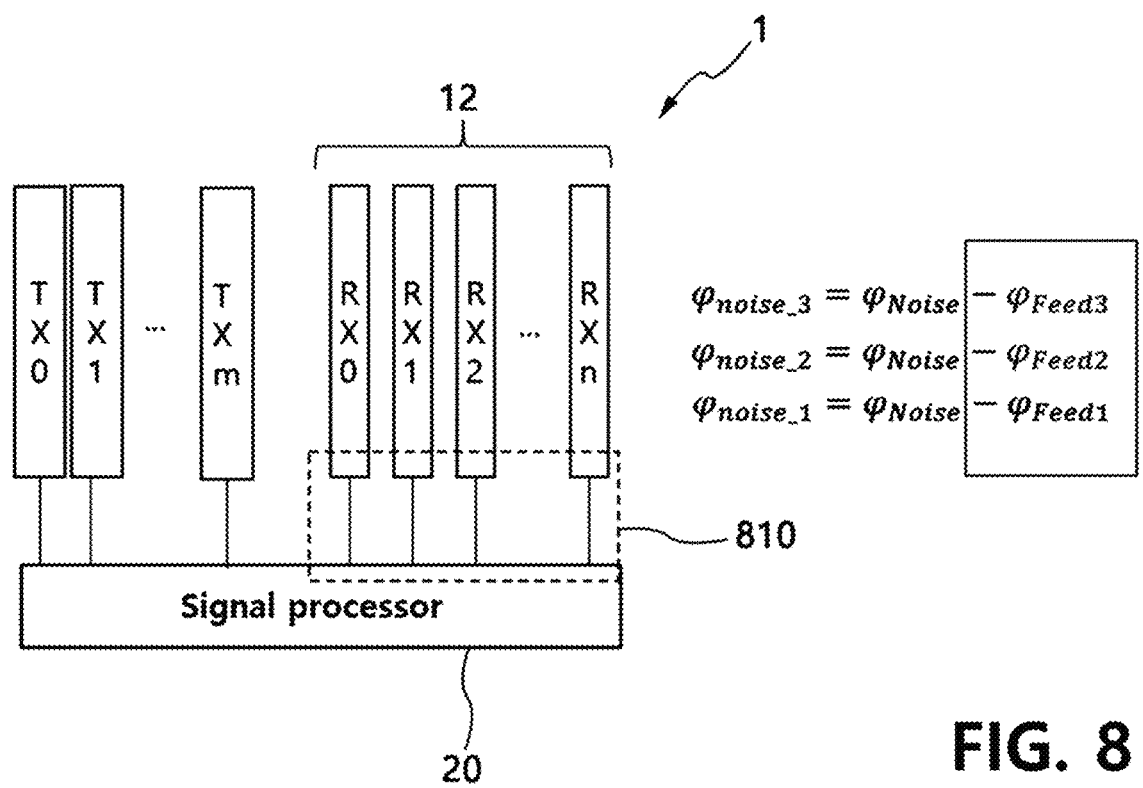
FIG. 8 is a diagram illustrating the phase correction according to the length of a feeding line according to another exemplary embodiment of the present invention.

FIG. 8 is a diagram illustrating the phase correction according to the length of a feeding line according to another exemplary embodiment of the present invention.

FIG. 8 schematically illustrates the radar device 1 according to an exemplary embodiment of the present invention. According to an exemplary embodiment of the present invention, the plurality of feeding lines 810 connecting the plurality of receiving antennas 12 and the signal processor 20 may be designed such that a false target corresponding to a noise signal is detected at a specific angle. Accordingly, the signal processor 20 may correct the phase of the noise signal based on the phase information of the feeding line 810 which is designed such that the false target corresponding to the noise signal is detected at a specific angle.

In the present invention, the specific angle means an angle outside the area for detecting a target. The area for detecting a target includes an area corresponding to a field of view (FOV) of the radar device 1. In this case, when the radar device 1 is disposed in front of the vehicle, the area for detecting a target may be a vehicle control area or a closest in-path vehicle (CIPV) area.

According to an exemplary embodiment of the present invention, the signal processor 20 may correct the phase of a noise signal such that the false target is detected at a specific angle outside the area where the antenna part 10 detects the target based on the phase information of the feeding line 810. In particular, when the antenna part 10 is disposed in front of the vehicle, the signal processor 20 may correct the phase of a noise signal such that the false target is detected at a specific angle outside the vehicle control area based on the phase information of the feeding line 810.

In this case, since the specific angle is eventually derived by the phase difference between the noise signals, it can be designed by adjusting the phase correction values ($\varphi_{Feed1}$, $\varphi_{Feed2}$, $\varphi_{Feed3}$) that make the phase difference, and the length of the feeding line 810 corresponding to each phase compensation value ($\varphi_{Feed1}$, $\varphi_{Feed2}$, $\varphi_{Feed3}$) may be designed.

Referring to FIG. 8, the plurality of feeding lines 810 may have different lengths. That is, the phase correction values ($\varphi_{Feed1}$, $\varphi_{Feed2}$, $\varphi_{Feed3}$) corrected by the feeding line 810 may have different values. According to an exemplary embodiment of the present invention, the feeding line 810 is designed to have phase correction values ($\varphi_{Feed1}$, $\varphi_{Feed2}$, $\varphi_{Feed3}$) that allow a false target corresponding to a noise signal to be detected at a specific angle. The process of designing the length of the feeding line 810 may be performed by a separate design device. The more detailed description of the design device will be described with reference to FIG. 9.

According to an exemplary embodiment of the present invention, it is possible to improve driving stability by preventing a false target from being detected in the detection area of the radar device 1 mounted on the vehicle.

Figure 9:
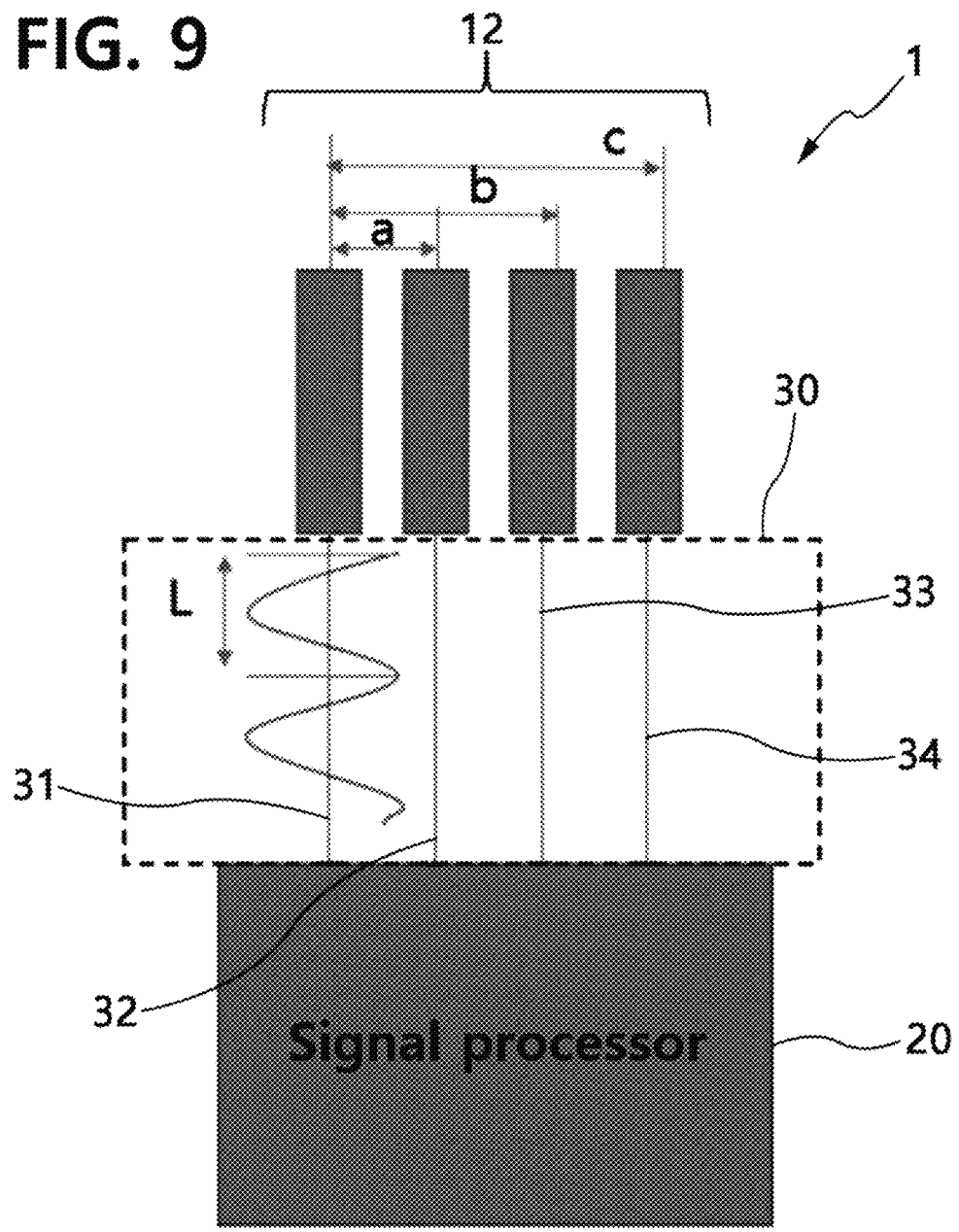
FIG. 9 is a diagram illustrating radar phase correction according to an exemplary embodiment of the present invention.

FIG. 9 is a diagram illustrating radar phase correction according to an exemplary embodiment of the present invention.

FIG. 9 schematically illustrates the radar device 1 according to an exemplary embodiment of the present invention. In the present exemplary embodiment, the radar device 1 includes four receiving antennas 12, and each receiving antenna is connected to the signal processor 20 through feeding lines 31, 32, 33, 34. Further, in the four receiving antennas 12, the intervals between the leftmost antenna and the remaining three antennas are a, b and c, respectively, and the phase correction values of the feeding lines 31, 32, 33, 34 are $\varphi_{Feed1}$, $\varphi_{Feed2}$, $\varphi_{Feed3}$ and $\varphi_{Feed4}$. In this case, the length of each feeding line 31, 32, 33, 34 may be different from each other.

Referring to FIG. 9, the waveform of the signal illustrated on the feeding line 31 will be reviewed. The length of one wavelength of this signal is L, and the length L of the wavelength may be determined according to the operating frequency and the material of a PCB substrate on which the antenna is disposed. When L is used, the length of the feeding line 31 can be calculated, and when L and the length of the feeding line 31 are used, the phase correction value of the feeding line 31 can be identified.

In this case, the process of designing the length of the feeding line may be performed by a separate design device (not illustrated). The design device may be implemented as a computer, a server or the like, and includes a processor. According to an exemplary embodiment of the present invention, the processor of the design device may execute software such as a program or the like to control at least one other component (e.g., a hardware or software component) of the design device, and perform various data processing or operations.

The processor according to an exemplary embodiment of the present invention may identify an area in which the radar device 1 detects a target, identify the phase of a noise signal entered into the radar device 1, identify the phase information of the feeding line based on the identified phase of the noise signal such that the false target corresponding to the noise signal is detected at a specific angle outside the area for detecting the target, and identify the length information of the feeding line based on the phase information. Meanwhile, the processor may perform at least one of machine learning, a neural network or a deep learning algorithm as a rule-based or artificial intelligence algorithm for at least part of data analysis, processing and result information generation for performing the operation. Examples of the neural network may include models such as a convolutional neural network (CNN), a deep neural network (DNN) and a recurrent neural network (RNN).

According to an exemplary embodiment of the present invention, the processor may identify the phase information of the feeding line based on the interval information between the plurality of receiving antennas 12, and identify the length of the feeding line corresponding to the phase information for each of the plurality of receiving antennas.

In the four receiving antennas 12 of FIG. 9, the intervals between the leftmost antenna and the remaining three antennas are a, b and c, respectively, and when the phases are $\varphi_{noise\_1}$, $\varphi_{noise\_2}$, $\varphi_{noise\_3}$ and $\varphi_{noise\_4}$ as a result of correcting the noise signals with the phase correction values ($\varphi_{Feed1}$, $\varphi_{Feed2}$, $\varphi_{Feed3}$, $\varphi_{Feed4}$) by the signal processor 20, the phase differences ($\varphi_{noise\_2}-\varphi_{noise\_1}$, $\varphi_{noise\_3}-\varphi_{noise\_1}$, $\varphi_{noise\_4}-\varphi_{noise\_1}$) of the phases of the leftmost antenna and the remaining three antennas are A, B and C, respectively. In this case, if it is established that the ratio between A, B and C is equal to the ratio between a, b and c, the angle of the false target corresponding to the noise signal may be detected.

EXPLANATION OF REFERENCE NUMERALS

1: Radar device
10: Antenna part
11: A plurality of transmitting antennas
12: a plurality of receiving antennas
20: Signal processor
30: Feeding part

The invention claimed is:

1. A radar device for a vehicle, comprising:
an antenna part comprising a plurality of transmitting antennas and a plurality of receiving antennas, the antenna part being formed of array antennas;
a signal processor for detecting a target by processing a radar signal and a reflected signal transmitted and received through the antenna part; and
a feeding part for correcting phases of the radar signal and the reflected signal through a feeding line connecting the antenna part and the signal processor,
wherein the signal processor corrects a phase of a noise signal based on phase information of a feeding line such that a false target corresponding to the noise signal incoming is detected at a specific angle outside a detection area of the radar device, and
wherein the phase information includes a phase correction value set to re-correct the phase of the reflected signal to detect the target, and the phase correction value varies depending on at least one of shape and length of the feeding line, a distance between the receiving antennas, and the material of a PCB substrate on which the receiving antennas are disposed.

2. The radar device of claim 1, wherein the feeding line is provided in plurality so as to respectively connect the plurality of transmitting antennas and the plurality of receiving antennas to the signal processor.

3. The radar device of claim 2, wherein each feeding line provided to respectively connect the plurality of receiving antennas and the signal processor is designed to have a length corresponding to the phase information.

4. The radar device of claim 1, wherein when the antenna part is disposed in front of a vehicle, the signal processor corrects the phase of the noise signal such that the false target is detected at a specific angle outside a vehicle control area based on the phase information of the feeding line.

5. The radar device of claim 1, wherein the signal processor re-corrects the phase of the reflected signal based on the phase information of the feeding line, and acquires information of the target based on the re-corrected reflected signal.

6. A method for controlling a radar device for a vehicle, comprising the steps of:
transmitting a radar signal through a plurality of transmitting antennas included in an antenna part and formed of array antennas;
receiving a reflected signal corresponding to the radar signal through a plurality of receiving antennas included in the antenna part and formed of array antennas;
correcting a phase of the reflected signal through a feeding line connecting the antenna part and a signal processor; and
correcting a phase of a noise signal based on phase information of a feeding line designed such that a false target corresponding to the noise signal incoming is detected at a specific angle outside a detection area of the radar device,
wherein the phase information includes a phase correction value set to re-correct the phase of the reflected signal to detect the target, and the phase correction value varies depending on at least one of shape and length of the feeding line, a distance between the receiving antennas, and the material of a PCB substrate on which the receiving antennas are disposed.

7. The method of claim 6, wherein the feeding line is provided in plurality so as to respectively connect the plurality of transmitting antennas and the plurality of receiving antennas to the signal processor.

8. The method of claim 7, wherein each feeding line provided to respectively connect the plurality of receiving antennas and the signal processor is designed to have a length corresponding to the phase information.

9. The method of claim 6, wherein the step of correcting the phase of the noise signal comprises correcting the phase of the noise signal such that the false target is detected at a specific angle outside a vehicle control area based on the phase information of the feeding line, when the antenna part is disposed in front of a vehicle.

10. The method of claim 6, further comprising the steps of:
re-correcting the phase of the reflected signal based on the phase information of the feeding line; and
acquiring target information based on the re-corrected reflected signal.

11. A design device for designing a feeding line installed in a radar device for a vehicle, comprising a processor for identifying an area in which the radar device detects a target, identifying a phase of a noise signal entered into the radar device, identifying phase information of a feeding line such that a false target corresponding to the noise signal is detected at a specific angle outside the area based on the phase of the identified noise signal, and identifying length information of the feeding line based on the phase information,
wherein the phase information includes a phase correction value set to re-correct a phase of a reflected signal to detect the target, and the phase correction value varies depending on at least one of shape and length of each feeding line, a distance between antennas, and a material of a PCB substrate on which the antennas are disposed.

12. The design device of claim 11, wherein the processor identifies the phase information based on interval information between a plurality of receiving antennas included in the radar device, and identifies the length of the feeding line corresponding to the phase information for each of the plurality of receiving antennas.

13. The design device of claim 11, wherein when the radar device is disposed in front of a vehicle, the processor identifies the phase information of the feeding line such that the false target is detected at a specific angle outside a vehicle control area.

* * * * *